United States Patent
Mullet et al.

(10) Patent No.: US 7,190,266 B2
(45) Date of Patent: Mar. 13, 2007

(54) PRE-INSTALLED APPLIANCE WITH WARNING SYSTEM AND METHODS OF OPERATION

(75) Inventors: Willis J. Mullet, Gulf Breeze, FL (US); Thomas B. Bennett, III, Wooster, OH (US); Yan Rodriguez, Suwanee, GA (US)

(73) Assignee: Wayne-Dalton Corp., Mt. Hope, OH (US)

( * ) Notice: Subject to any disclaimer, the term of this patent is extended or adjusted under 35 U.S.C. 154(b) by 90 days.

(21) Appl. No.: 10/988,124

(22) Filed: Nov. 12, 2004

(65) Prior Publication Data

US 2006/0114116 A1 Jun. 1, 2006

(51) Int. Cl.
*G08B 1/00* (2006.01)
*G08B 21/00* (2006.01)
*G08B 1/08* (2006.01)
*G04B 47/00* (2006.01)
*G04F 1/00* (2006.01)
*G04F 1/04* (2006.01)
*G04F 8/00* (2006.01)

(52) U.S. Cl. ............. 340/540; 340/309.7; 340/309.16; 340/539.1; 340/539.11; 340/5.71; 368/10; 368/12; 368/89; 368/94; 368/107; 368/108; 368/109

(58) Field of Classification Search ................ 340/540, 340/309.15, 309.16, 539.1, 539.11, 309.7, 340/5.71; 368/10, 12, 89, 94, 109
See application file for complete search history.

(56) References Cited

U.S. PATENT DOCUMENTS

| | | | | |
|---|---|---|---|---|
| 4,624,578 A | * | 11/1986 | Green | 368/10 |
| 4,700,296 A | * | 10/1987 | Palmer et al. | 705/32 |
| 5,053,884 A | * | 10/1991 | Kamijyo | 725/30 |
| 5,419,010 A | | 5/1995 | Mullet | 16/198 |
| 6,075,688 A | | 6/2000 | Willard et al. | 361/92 |
| 6,120,262 A | | 9/2000 | McDonough et al. | 417/424.1 |

(Continued)

FOREIGN PATENT DOCUMENTS

AU 199712267 B2 1/1997

(Continued)

OTHER PUBLICATIONS

U.S. Appl. No. 10/463,044, filed Jun. 17, 2003, Mullet et al.

(Continued)

*Primary Examiner*—Daniel Wu
*Assistant Examiner*—Lam Pham
(74) *Attorney, Agent, or Firm*—Renner Kenner Greive Bobak Taylor & Weber

(57) ABSTRACT

A limited-use appliance, such as a garage door operator or a home network bridge device, is disclosed which has at least one input device for generating an input signal and a controller associated with the input device and receiving the input signal. The controller initiates at least one limited-use function of the appliance upon receipt of the input signal. A test device is maintained by the controller, and has a predetermined criteria which determines whether the input signal should be sent on to the controller or not. A warning system may be incorporated so that imminent expiration of the limited-use functions initiate warnings for the benefit of the end-user.

22 Claims, 11 Drawing Sheets

U.S. PATENT DOCUMENTS

| | | | |
|---|---|---|---|
| 6,155,160 A | 12/2000 | Hochbrueckner | 99/331 |
| 6,166,525 A | 12/2000 | Crook | 322/11 |
| 6,172,432 B1 | 1/2001 | Schnackenberg et al. | 307/23 |
| 6,177,780 B1 | 1/2001 | Roy et al. | 320/128 |
| 6,188,198 B1 | 2/2001 | Gunton | 320/117 |
| 6,243,000 B1 | 6/2001 | Tsui | 340/5.21 |
| 6,355,885 B1 | 3/2002 | Rintz et al. | 174/66 |
| 6,392,349 B1 | 5/2002 | Crenshaw | 315/86 |
| 6,481,013 B1 | 11/2002 | Dinwiddie et al. | 725/80 |
| 6,489,746 B1 | 12/2002 | Pettinato | 320/111 |
| 6,502,044 B1 | 12/2002 | Lane et al. | 702/63 |
| 6,933,834 B2 * | 8/2005 | Diggins, Jr. | 340/309.16 |
| 7,123,128 B2 * | 10/2006 | Mullet et al. | 340/5.71 |
| 2004/0008582 A1 * | 1/2004 | Richards et al. | 368/10 |
| 2004/0160335 A1 | 8/2004 | Reitmeier | 340/825 |
| 2004/0198251 A1 | 10/2004 | Fitzgibbon | 455/91 |

FOREIGN PATENT DOCUMENTS

| | | |
|---|---|---|
| EP | 1 031 480 A1 | 8/2000 |
| EP | 1 260 659 A2 | 11/2002 |
| EP | 1 271 418 A1 | 1/2003 |
| EP | WO 2004/066454 A | 8/2004 |
| WO | WO 93/14571 | 7/1993 |

OTHER PUBLICATIONS

U.S. Appl. No. 10/859,806, filed Jun. 2, 2004, Rodriguez.

* cited by examiner

PRE-INSTALLED APPLIANCE WITH WARNING SYSTEM AND METHODS OF OPERATION

TECHNICAL FIELD

Generally, the present invention relates to a pre-installed appliance, such as a home network system and/or a garage door operator system for use on a closure member moveable relative to a fixed member, and a method for purchasing the same. More particularly, the present invention relates to a pre-installed appliance that is either purchased or leased directly from a manufacturer. More specifically, the present invention relates to an appliance that has limited-use capabilities, wherein these capabilities can only be fully implemented upon a lease or purchase of an activation code from the manufacturer, wherein expiration warnings in the form of reduced operability are provided.

BACKGROUND ART

When constructing a home or a facility, it is well known to provide garage doors which utilize a motor to provide opening and closing movements of the door. Motors may also be coupled with other types of movable barriers such as gates, windows, retractable overhangs and the like. An operator is employed to control the motor and related functions with respect to the door. The operator receives command input signals for the purpose of opening and closing the door from a wireless remote, from a wired wall station, from a keyless entry device or other similar device. It is also known to provide safety devices that are connected to the operator for the purpose of detecting an obstruction so that the operator may then take corrective action with the motor to avoid entrapment of the obstruction.

To assist in moving the garage door or movable barrier between limit positions, it is well known to use a remote radio frequency or infrared transmitter to actuate the motor and move the door in the desired direction. These remote devices allow for users to open and close garage doors without having to get out of their car. These remote devices may also be provided with additional features such as the ability to control multiple doors, lights associated with the doors, and other security features. Indeed, these remote devices may be enabled to control a home network which in turn controls lights and other appliances contained within the home or facility. In order to control the home network, a bridge device may be employed as a communications link between the operator and the network. As is well documented in the art, the remote devices and operators may be provided with rolling or hopping codes that change after every operation cycle so as to make it virtually impossible to "steal" a code and use it at a later time for illegal purposes. An operation cycle may include opening and closing of the barrier, turning on and off a light that is connected to the operator and so on.

Currently, barrier operators and the home network are some of the last devices that are installed at a construction site. In regard to the home network, it cannot be fully implemented until all the other network appliances are installed. In regard to the barrier, once the operator is installed, the access needed by the construction crews is limited. In other words, once the barrier operator is installed and connected to the movable barrier, construction crews may not have access into the facility to perform their designated functions. Another reason is that if the barrier operator is installed early on in the construction, the appearance of the operator may be diminished, inasmuch as painting and texturing of the surrounding structure may be undertaken. Finally, the portable remote control devices which are used to actuate the operator may become lost or stolen.

One way around this problem is to have just the barrier, such as a garage door, without an operator, installed during construction for the purpose of having a storage place for construction materials being used and appliances that will be later installed in the home or facility. However, if these materials are not secure, they can also be stolen. Manual locks may be used, but that means a construction crew must ensure that they have a key for access. Further, many garages today have surfaces that are painted or otherwise finished. The installation of a garage door or a garage door operator must be attached directly to the frame components of the structure and not have materials positioned between the structure and the component, which may lead to premature failure of the attachment. Accordingly, it is quite desirable for the garage door or movable barrier and the associated operator to be installed prior to the garage being finished.

Another drawback for the installation of barrier operators, and, for that matter any large appliance, such as a home network, a furnace, an air conditioning unit, a sauna, a refrigerator and the like, is that the appliances are purchased in a similar manner and charged to the customer at closing of the home sale. Until then, the builder or contractor is responsible for all costs incurred. Accordingly, depending on the number of appliances installed, purchases of the appliances can amount to a significant portion of the expenses to the builder or contractor and a significant portion of the closing costs. As will be appreciated, this can be a significant outlay of funds and if, for whatever reason, the purchaser cannot pay the closing costs, the contractor is liable.

One attempt at overcoming the installation and payment of barrier operators is disclosed in U.S. patent application Ser. No. 10/463,044 filed Jun. 17, 2003 and which is incorporated herein by reference. Briefly, this application discloses an operator that is installed and then becomes non-functional after a period of time or predetermined number of uses, unless the appliance is purchased. But, such a configuration provides no warning that the initial use time period is about to expire.

Therefore, there is a need in the art for a pre-installed appliance, such as an operator or a home network, which provides at least one type of warning prior to expiration of the initial use period.

DISCLOSURE OF THE INVENTION

One of the aspects of the present invention, which shall become apparent as the detailed description proceeds, is achieved by a limited-use appliance which generates expiration warnings, comprising at least one input device for generating an input signal; a controller associated with the at least one input device and receiving the input signal, the controller initiating at least one limited-use function of the appliance upon receipt of the input signal; a test device maintained by the controller, the test device having a predetermined criteria which determines whether the input signal should be sent on to the controller; and a warning system maintained by the controller and monitoring the predetermined criteria, the warning system generating a warning signal when the predetermined criteria reaches a predetermined level.

Another aspect of the present invention is attained by a method for providing a use expiration warning for a pre-installed appliance, comprising pre-installing an appliance with a controller, the controller operating the appliance; associating at least one input device from a group of input devices with the controller, wherein the input device generates an input signal to operate the appliance; testing a predetermined criteria maintained by the controller; generating a warning signal when the predetermined criteria reaches a predetermined level; and blocking the input signal when the predetermined criteria is met.

BRIEF DESCRIPTION OF THE DRAWINGS

For a complete understanding of the objects, techniques and structure of the invention, reference should be made to the following detailed description and accompanying drawings, wherein.

BEST MODE FOR CARRYING OUT THE INVENTION

Figure 1:
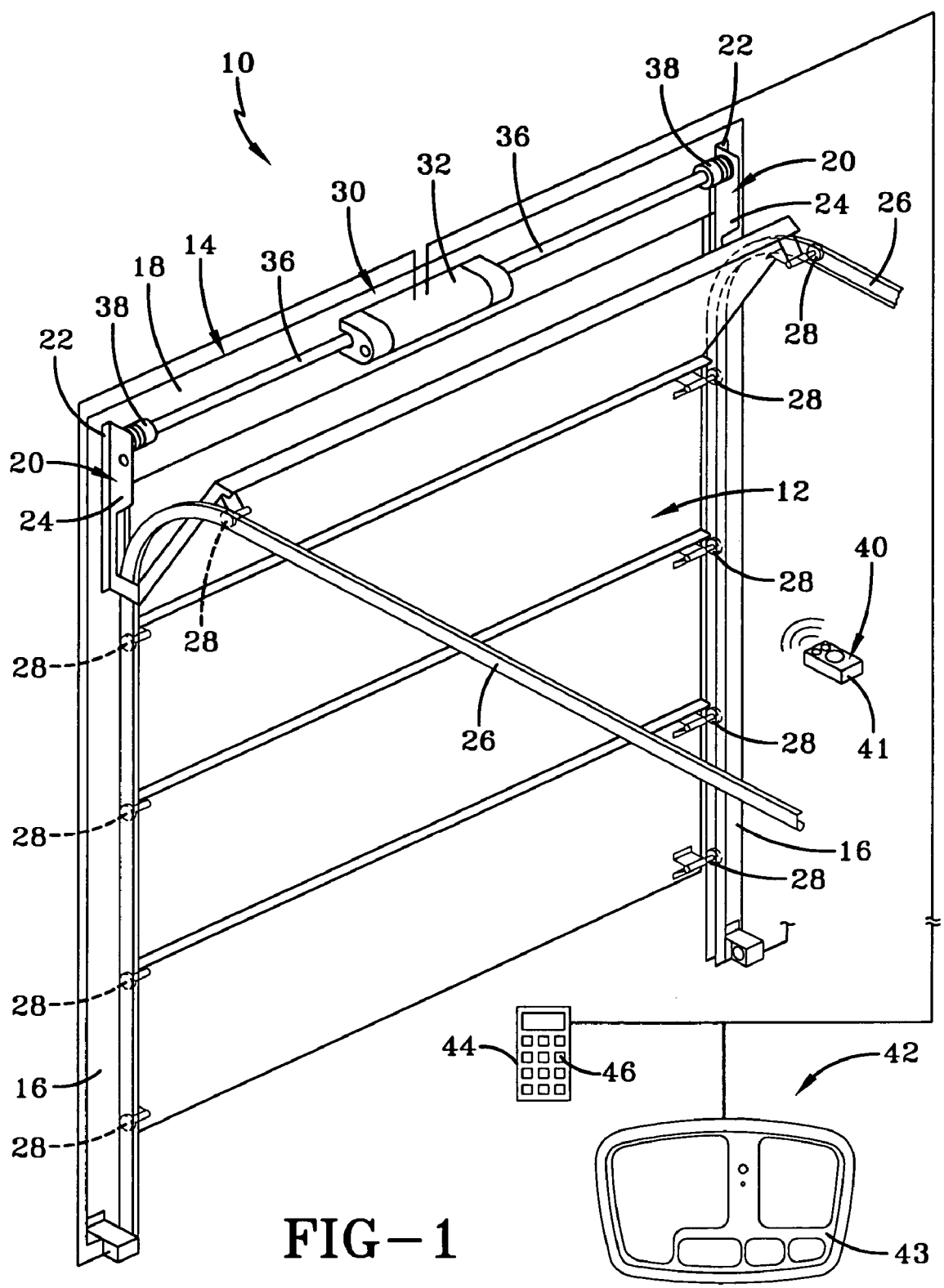
FIG. 1 is a perspective view depicting a sectional garage door and showing an operating mechanism embodying the concepts of the present invention.

An appliance, such as a garage door operator system which incorporates the concepts of the present invention is generally designated by the numeral 10 in FIG. 1. Although the present discussion is specifically related to an appliance such as a garage door operator, it will be appreciated that the teachings of the present invention are applicable to other large appliances. In any event, the system 10 is employed in conjunction with a conventional sectional garage door generally indicated by the numeral 12. The door 12 may or may not be an anti-pinch type door. The opening in which the door is positioned for opening and closing movements relative thereto is surrounded by a frame, generally indicated by the numeral 14, which consists of a pair of a vertically spaced jamb members 16 that, as seen in FIG. 1, are generally parallel and extend vertically upwardly from the ground. The jambs 16 are spaced and joined at their vertical upper extremity by a header 18 to thereby form a generally U-shaped frame 14 around the opening for the door 12. The frame 14 is normally constructed of lumber or other structural building materials for the purpose of reinforcement and to facilitate the attachment of elements supporting and controlling the door 12.

Secured to the jambs 16 are L-shaped vertical members 20 which have a leg 22 attached to the jambs 16 and a projecting leg 24 which perpendicularly extends from respective legs 22. The L-shaped vertical members 20 may also be provided in other shapes depending upon the particular frame and garage door with which it is associated. Secured to each projecting leg 24 is a track 26 which extends perpendicularly from each projecting leg 24. Each track 26 receives a roller 28 which extends from the top edge of the garage door 12. Additional rollers 28 may also be provided on each top vertical edge of each section of the garage door to facilitate transfer between opening and closing positions.

A counterbalancing system generally indicated by the numeral 30 may be employed to balance the weight of the garage door 12 when moving between open and closed positions. One example of a counterbalancing system is disclosed in U.S. Pat. No. 5,419,010, which is incorporated herein by reference. Generally, the counter-balancing system 30 includes a housing 32, which is affixed to the header 18 and which contains an operator mechanism 34 best seen in FIG. 2. Extending through the operator housing 32 is a drive shaft 36, the opposite ends of which carry cable drums 38 that are affixed to respective projecting legs 24. Carried within the drive shaft 36 are counterbalance springs as described in the '010 patent. Although a header-mounted operator is disclosed, the control features to be discussed later are equally applicable to other types of operators used with movable barriers. For example, the control routines can be easily incorporated into trolley type operators used to move garage doors. The drive shaft 36 transmits the necessary mechanical power to transfer the garage door 12 between closed and open positions. In the housing 32, the drive shaft 36 is coupled to a drive gear wherein the drive gear is coupled to a motor in a manner well known in the art.

Briefly, the counter-balancing system 30 may be controlled by a wireless remote transmitter 40, which has a housing 41, or a wall station control 42, which has a housing 44, that is wired directly to the system 30 or which may communicate via radio frequency or infrared signals. The wall station control 42 is likely to have additional operational features not present in the remote transmitter 40. The wall station control 42 is carried by a housing 43 which has a plurality of buttons thereon which may be associated with activation numbers as will be discussed in detail later. The system 30 may also be controlled by a keyless alphanumeric device 44. The device 44 includes a display and a plurality of keys 46 with alphanumeric indicia thereon. Actuating the keys 46 in a predetermined sequence allows for actuation of the system 30. At the least, the devices 40, 42 and 44 are able to initiate opening and closing movements of the door coupled to the system 30. Although the present invention is described in the context of a sectional garage door, the teachings of the invention are equally applicable to other types of movable barriers such as single panel doors, gates, windows, retractable overhangs and any device that at least partially encloses an area. And, as noted previously, the invention is applicable to any major appliance which is installed in a location during construction of a facility. For example, the teachings of the present invention are applicable to heating and air conditioning systems, refrigerators, ovens, hot tubs, saunas a home network system or any device which is installed before or after construction of a facility and which a user would rather lease than purchase outright.

Figure 2:
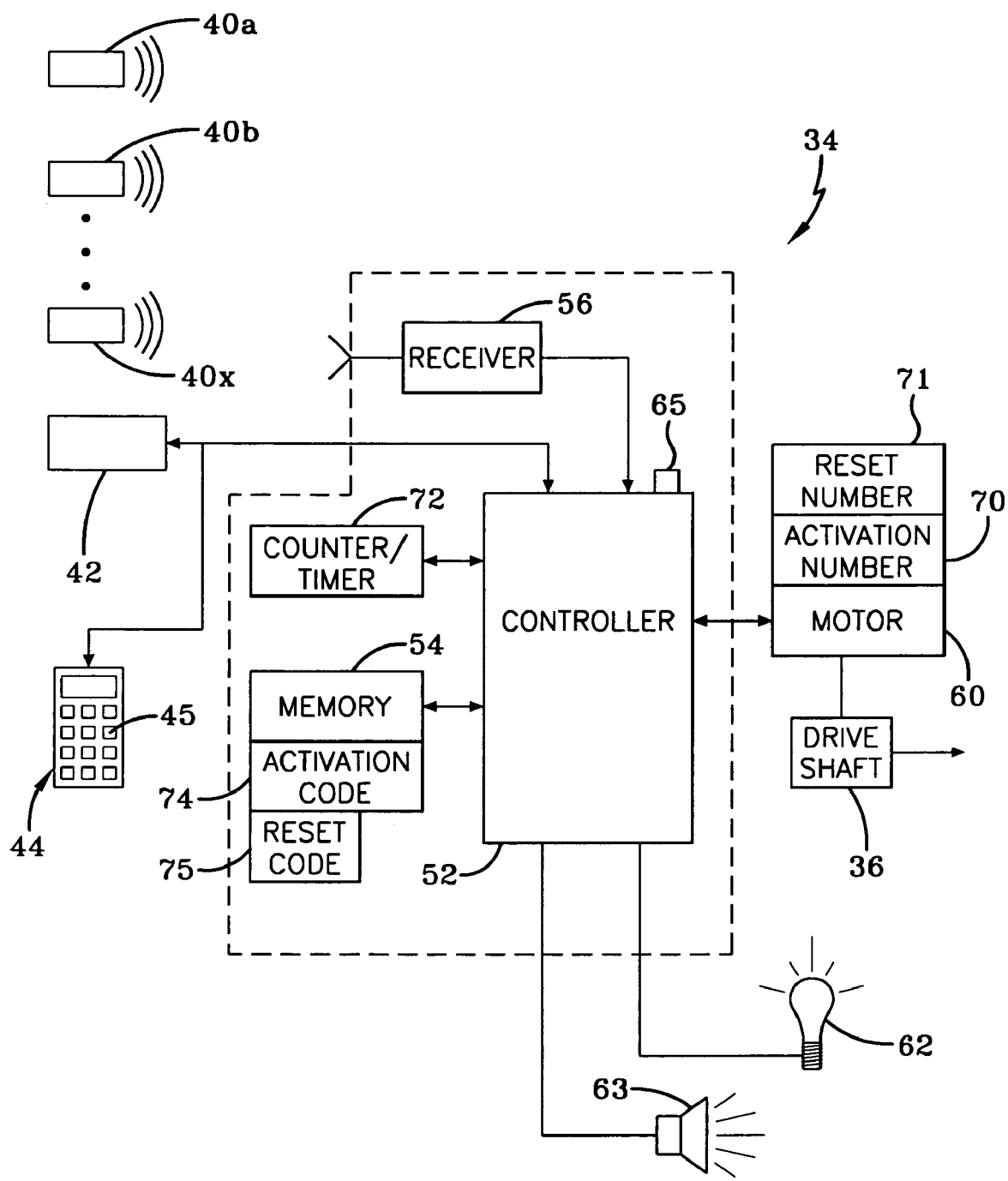
FIG. 2 is a block drawing of an operator according to the present invention.

An operator mechanism, which is designated generally by the numeral 34 in FIG. 2, is contained within the housing 32 and monitors operation of the motor and various other elements connected to the operator mechanism 34 as will be described hereinbelow. A power source is used to energize the foregoing elements.

The operator mechanism 34 includes a controller 52 which incorporates the necessary software, hardware and memory storage devices for controlling the operation of the operator mechanism 34. In electrical communication with the controller 52 is a non-volatile memory storage device 54 for permanently storing information utilized by the controller in conjunction with the operation of the operator mechanism 34. Infrared and/or radio frequency signals are received by a receiver 56 which transmits the received information to a decoder contained within the controller. The controller 52 converts the received radio frequency signals or other types of wireless signals into a usable format. It will be appreciated that an appropriate antenna is utilized by the receiver 56 for receiving the desired signals. It will also be appreciated that the controller 52 is capable of directly receiving transmission type signals from a direct wire source as evidenced by the direct connection to the wall station 42. And the keyless device 44, which may also be wireless, is also connected to the controller 52. As such, one can use the appliance, which in this case is the operator mechanism 34, by entering a four- or five-character identification number. In any event, any number of remote transmitters 40a–x can transmit a signal that is received by the receiver 56 and further processed by the controller 52 as needed. Likewise, there can be any number of wall stations. If the input signals received from either the remote transmitter 40, or the wall station control 42 or the keyless device 44 are acceptable, the controller 52 generates the appropriate electrical input signals for energizing the motor 60 which in turn rotates the drive shaft 36 and opens and/or closes the movable barrier. A light 62, which may be turned on and off independently or whenever an open/close cycle is initiated, may also be connected to the controller 52. An audio speaker 63 is also connected to the controller 52 and with the light may be used to indicate various operational states and/or programming states of the operator mechanism. A program button 65 may be connected to the controller 52 so as to enable learning of transmitters to the operator in a conventional manner.

Implementation of the present invention requires additional features to be associated with the operator mechanism 34. In particular, an activation number indicia 70 and a reset number indicia 71 are provided on the motor 60, on the operator housing 32 and/or on any partially concealed location. In other words, the activation number indicia 70 and reset number indicia 71 are easily found upon reading the instructions provided with the operator mechanism, such that the indicia can be easily read. Use of the activation number indicia 70 and reset number indicia 71 will be discussed in detail below.

A counter/timer, designated generally by the numeral 72, is associated with the controller and is collectively referred to as "predetermined criteria." The counter/timer is a programmable feature of the controller and allows the manufacturer of the operator mechanism to set a criteria which allows for limited use of the operator mechanism and the associated appliance for a predetermined period of time or predetermined number of cycles. In other words, the counter feature allows a user, upon installation of the appliance, and in this case a garage door operator, to fully open and close a barrier for 120 cycles. Of course, the number of cycles may be adjusted as deemed appropriate. In the event a timer feature is utilized with the operator mechanism a date can be programmed into the counter/timer 72 such that after a certain date, the operator mechanism is disabled. Likewise, once the counter mechanism has decremented to zero, then the operator is likewise disabled. Of course an up counter could also be utilized. If desired, the operator mechanism may be allowed to operate the light 62 but not be able to open and close the device after the predetermined criteria is met. Indeed, upon expiration of the predetermined criteria, that is, the number of cycles has been depleted or the date has been exceeded, the operation of the device may default to either an open or closed position and in the preferred embodiment the open position would be maintained.

Stored in the memory device 54 is an activation code 74. The activation code is correlated with the activation number 70 such that transmission of an activation number to a third party or to the manufacturer would allow them to provide the activation code which allows for full unencumbered operation of the operator mechanism 34. A reset code 75 may also be stored in the memory device 54. The reset code correlates with the reset number 71. In much the same manner as the activation code, use of the reset code may allow continued operation. In other words, use of the reset code will allow for the counter number to be increased, or the time or expiration date to be adjusted. Use of the reset code is preferably a one-time event. But, it will be appreciated that there may be more than one reset code stored in memory so as to allow for multiple renewals or adjustments of the counter/timer 72. It will also be appreciated that the activation code 74 may be further distinguished as an activation lease code, which would require adjustment of the counter/timer or an activation purchase code which would eliminate the need for the counter/timer upon purchase of the operator mechanism.

Figure 3:
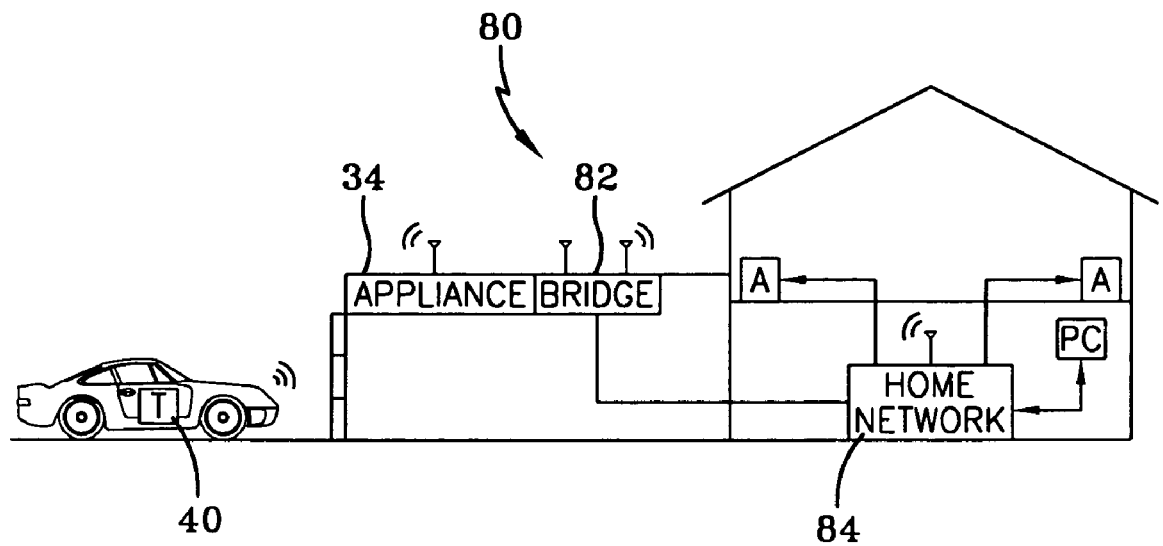
FIG. 3 is a schematic diagram of a home network employing a bridge device in accordance with the concepts of the present invention.

The operator mechanism 34 may be incorporated into a home network system designated generally by the numeral 80 as shown in FIG. 3. Such a device is disclosed in U.S. patent application Ser. No. 10/859,806, filed Jun. 2, 2004, which is incorporated herein by reference. Briefly, the network system 80 includes a bridge device 82, which functions as an interface between the transmitters 40, 42 employed in the opening and closing of movable barriers such as a garage door, gate, or other related device; and a home network designated generally by the numeral 84. It will be appreciated that the home network 84 refers to any appliance type network maintained in a building, warehouse or similar structure. The bridge device 82, as will become apparent as the description proceeds, receives signals and communicates with at least one transmitter, designated as a T in the drawing, which may be carried by an automobile or other moving object. The transmitter is typically utilized with the garage door operator mechanism designated as "GDO" in FIG. 3, but could be some other type of wired or wireless transmitter. In other words, actuation of a button on the transmitter generates a code that may be received either singly or by both the garage door operator to control movement of the door and related features, and by the bridge device which passes along the code to the home network. Indeed, the transmitters may have more than one button wherein each button is assigned a specific function in the home network. And the bridge device may be configured to process transmitter codes solely for the operator or solely for the home network, or for both the operator and the home network. The transmitter may employ fixed or rolling codes in order to provide security features related to the opening and closing of the garage door and the network. And any one of the transmitters may be a "hands-free" transmitter which initiates a preset command based upon the proximity or direction of travel of the transmitter with respect to the garage door operator and/or the bridge device 82.

The home network 84, which itself is considered to be an appliance, is connected either via wires or by wireless communication devices to network-type appliances 84 such as air conditioners, furnaces, lights contained throughout the facility, entertainment systems, refrigerators, scales, personal computers, plumbing fixtures and the like. And the home network 84 may be linked to other home networks contained within a community or within a facility. Control of the home network may be implemented by a personal computer—designated as PC in the drawing—or a personal digital assistant, either of which may be referred to as a "master controller."

Figure 4:
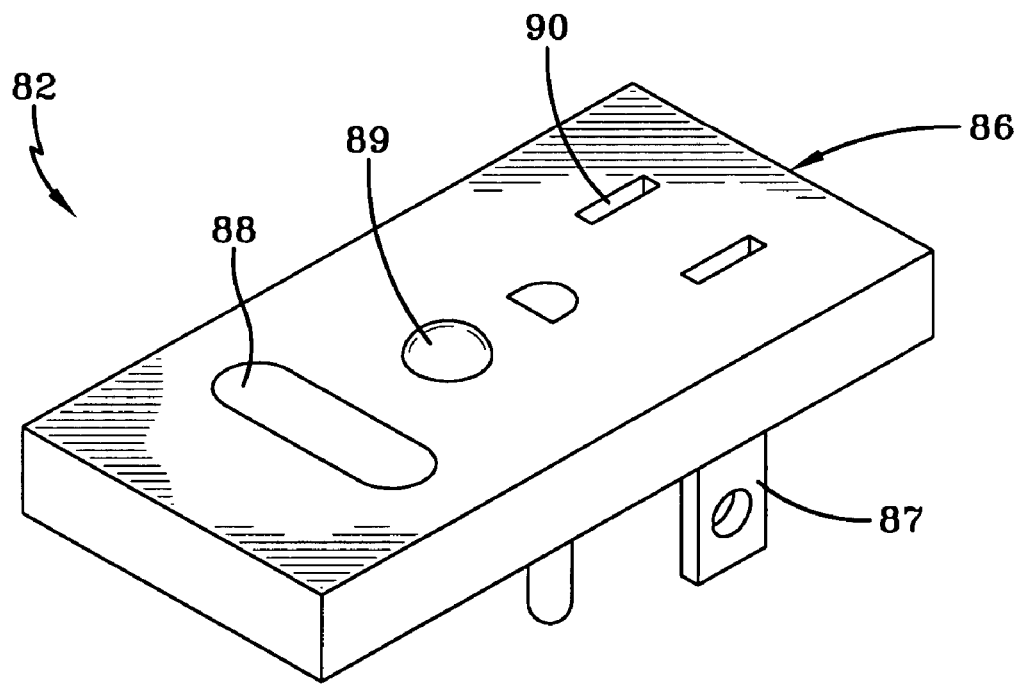
FIG. 4 is a perspective view of an exemplary bridge device made in accordance with the concepts of the present invention.

Referring now to FIG. 4, it can be seen that the bridge device 82 includes a housing designated generally by the numeral 86. The housing provides a standard power outlet plug 87 that fits in any receptacle. The plug may receive power directly from the residential power source such as a 120V AC or it may receive power from any transformed power source that is grounded and complies with the appropriate safety standards. The housing 86 provides at least one learn switch 88 that is used to learn various components within the home network and/or the transmitters. The housing 86 also provides a status light 89A or an audio speaker 89B which may facilitate the learning of the bridge device with components within the home network and the transmitters. The light, speaker or any like perceptible output device is employed to indicate various operation or programming states. The housing 86 may also provide a power receptacle 90 which allows for a switched component to be associated with the bridge device.

Figure 5:
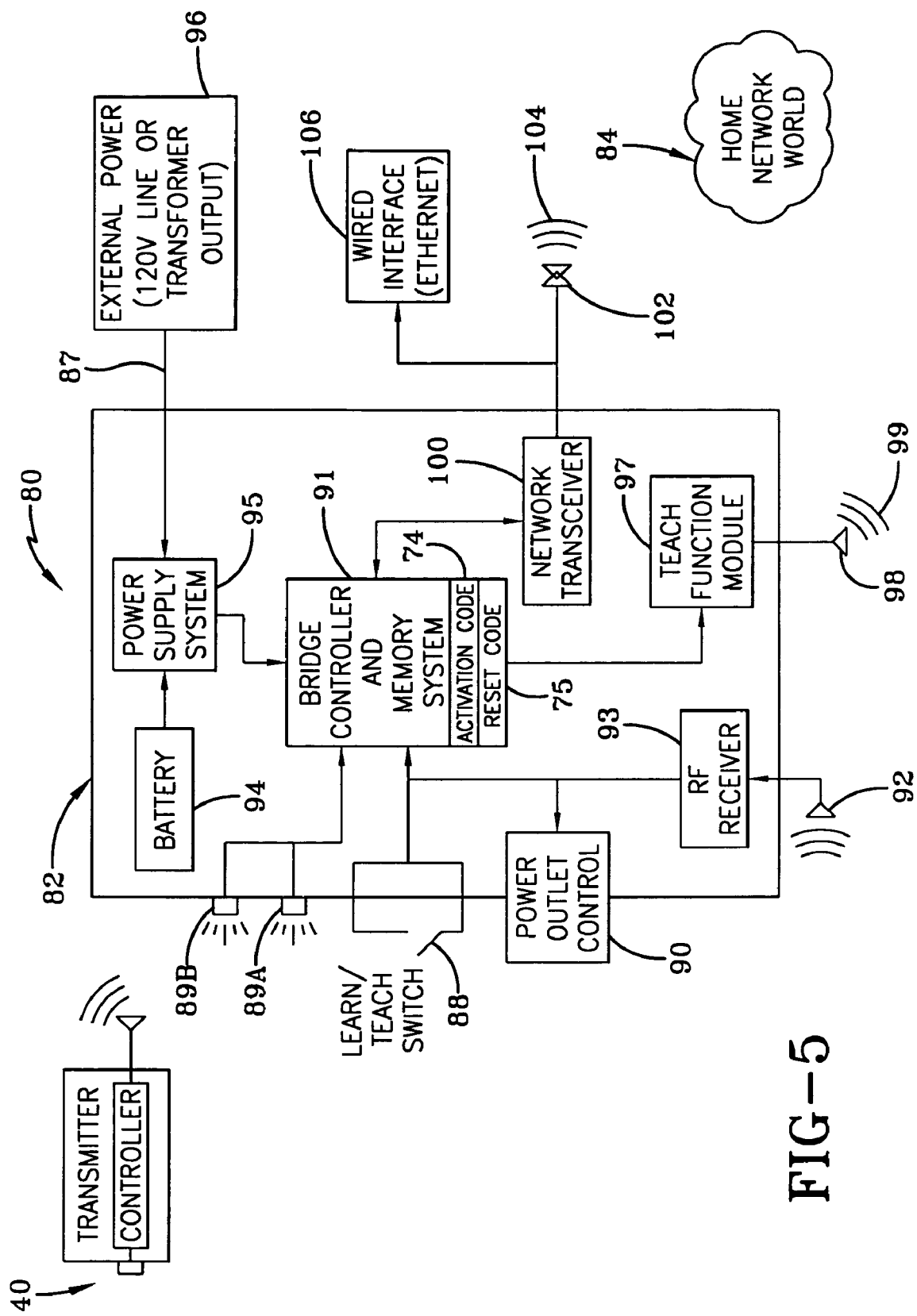
FIG. 5 is a schematic diagram of the exemplary bridge device employed in conjunction with a transmitter utilized to move a barrier and initiate commands implemented by the home network.

Referring now to FIG. 5, it can be seen that the interface system 80 includes the bridge device 82 and at least one transmitter designated generally by the numeral 40. Also included within the system is the home network 84. Various types of transmitters may be employed in the interface system, although it is believed that in the preferred embodiment the transmitters are associated with a garage door operator that moves a barrier between predetermined limit positions.

In order for the bridge device to function as an appliance in the present embodiment, the bridge device 80 also includes a bridge controller and memory system designated generally by the numeral 91. The bridge controller 91 is connected to all of the components mentioned above such as the plug 87, the switch 88, the status light 89 and the power receptacle 90. The bridge controller and memory system 91 includes the necessary hardware, software and memory to facilitate communications between the bridge's internal components and to facilitate communication between the transmitters and the network world 84. The home network, much like the operator mechanism, may also be provided with an activation code 74, and a reset code 75 associated with the memory contained within the bridge controller 91. This allows for both the operator mechanism and the bridge device to be pre-installed by the contractor and evaluated by the end-user prior to purchase in a manner to be described. The bridge includes an antenna 92 that receives radio frequency or other types of wireless signals generated by the transmitters for transfer to an appropriate receiver 93. The receiver 93 is connected to the controller and receives at least the RF signals from the transmitters. The signals received by the receiver 93 are submitted to the controller and memory system 91 for validation and confirmation.

Contained within the housing 86 is an internal battery 94 which is preferably a long-life battery of about 3 volts. Of course, other battery voltages could be used if appropriate. The battery 94 is connected to a power supply control system 95 which is directly linked to the bridge controller 91. Also connected to the power supply system is the plug 87 which receives external AC/DC power 96 which may either be 120V line or transformer output regulated power. The bridge controller and memory system 91 defaults to the external power source 96 if connected. It will be appreciated as the detailed description proceeds that the type of power employed by the bridge device dictates the bridge's mode of operation which is employed for the learning of the various devices to the bridge and for the general operation of the bridge.

A teach function module 97 is connected to the bridge controller 91 and undertakes various functions upon actuation of the learn/teach switch 88 and depending upon the power supply utilized by the controller 91. Actuation of the learn teach switch causes the bridge controller and the teach function module to generate a code that is emitted by an antenna 98 preferably in the form of a radio frequency code 99. The code 99 may be received by one type of transmitter as required by the end use.

A network transceiver, designated generally by the numeral 100, is connected to the bridge controller and memory system 91 and functions to communicate directly with the network world 84 by generating a network radio frequency signal 104 that is emitted by an antenna 102. Alternatively, a wired interface 106 may be connected to the network transceiver 100 to allow for direct communications to the network world 12.

The transmitter 40 is programmable with the operator mechanism and the bridge device in any number of ways known in the art. One common way is to press the program button 65 on the operator or the button 88 on the bridge device to enter a program mode and within a predetermined period of time press the transmitter button to emit a coded radio frequency signal to be associated with the respective controller.

Figure 6:
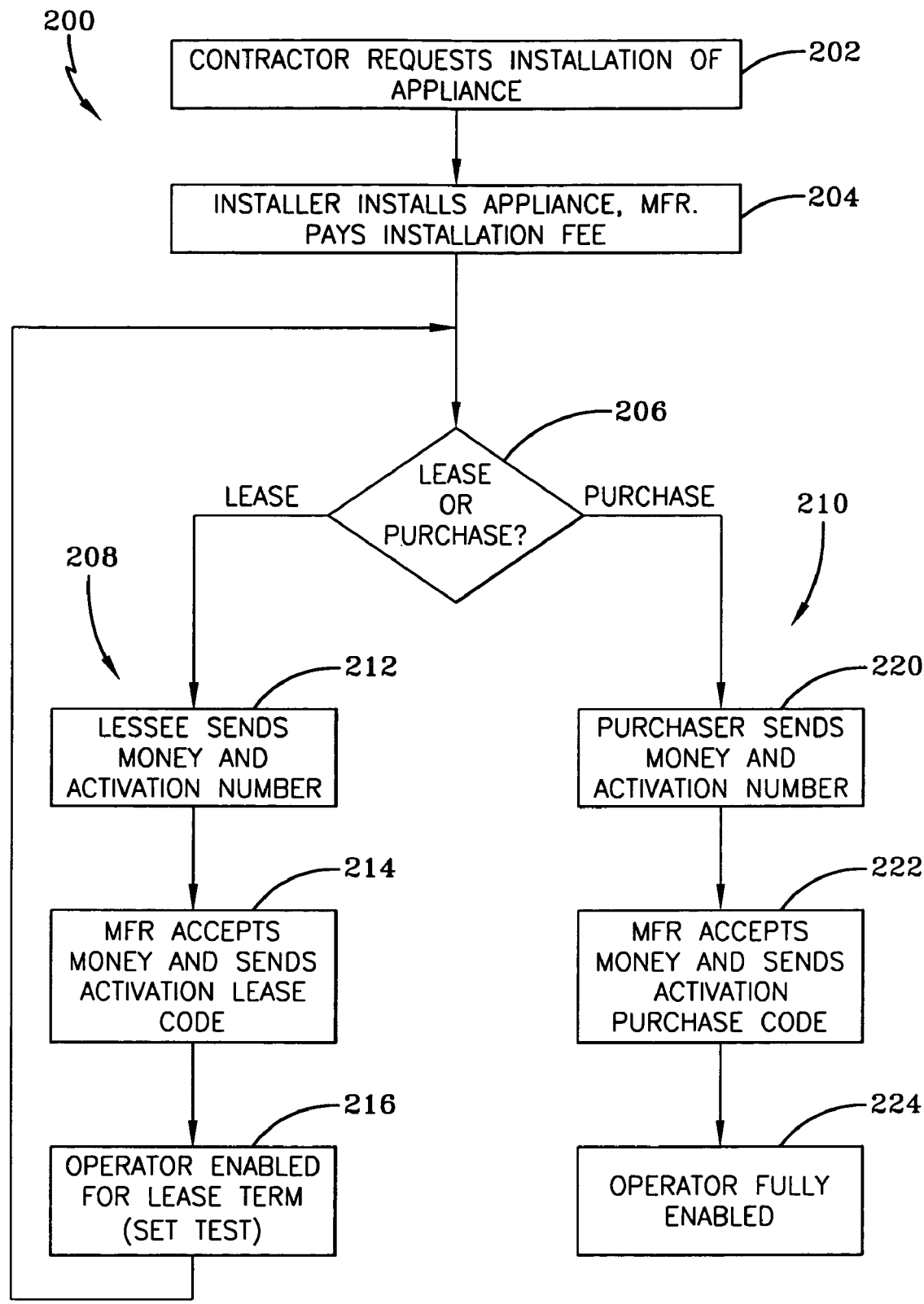
FIG. 6 is an operational flow chart illustrating the purchase or lease of a pre-installed operator according to the present invention.

Referring now to FIG. 6, an operational flow chart for establishing the relationship between the manufacturer of an appliance and the purchaser and/or renter of the appliance is designated generally by the numeral 200. At a first step 202, a contractor requests installation of an appliance from an authorized dealer or directly from a manufacturer. At step 204, the dealer installs the appliance and the manufacturer pays the installer or the authorized dealer an installation fee.

At step 206, the purchaser of the home or facility decides whether to lease or purchase the appliance. In one scenario, the appliance may be installed and become fully functional at a later time. In this scenario, the contractor could lease the appliance and charge the owner later, or require the prospective home owner to proceed with the lease. Accordingly, the contractor would be allowed to enter and access the garage or other opening as needed to secure tools, materials and other items. In the preferred embodiment, the appliance is installed with the keyless device 44 so as to allow use of an alphanumeric code to allow access to the facility or home under construction. In this way, once the facility or home is finally completed, the alphanumeric code can be changed for security purposes. In another scenario, the contractor could simply require the prospective owner to purchase the appliance. If the contractor requires the facility owner or homeowner to proceed with leasing the device, then the process proceeds with the steps designated generally by the numeral 208 or, in the alternative, the installer may require the device to be directly purchased, as indicated by the steps designated generally by the numeral 210.

If the lease procurement steps 208 are selected, the lessee, at step 212, sends a currency amount, either electronically or via a credit card, and the activation number 70 to the appliance manufacturer or designated representative. At step 214 the manufacturer or their representative accepts the currency amount and sends an activation lease code 74 back to the lessee. As discussed previously, the activation lease code will only allow for the controller 52 to adjust the counter/timer 72 an appropriate amount. Accordingly, the manufacturer and the lessee may agree to a predetermined number of uses or time period for which the lease agreement can extend. For example, the lessee may only be using the facility for a month and would only desire a month's use of the appliance. In the alternative, the lessee may desire six months use of the appliance and, as such, an appropriate activation lease code could be submitted to the lessee, which would be recognized for the counter/timer as an appropriate amount. It will also be appreciated that manufacturer could configure a telephone line or wireless-type communication device with the operator mechanism to allow for programming the number of uses and/or expiration date of the lease agreement. In any event, at step 216 the lessee enables the operator mechanism for lease by submitting the activation lease code 74 via the keyless device 46. Alternatively, the manufacturer could send a remote transmitter by overnight delivery that enables operation of the controller for a certain period of time. Or the lessee may utilize a remote transmitter shipped with the operator, wherein activation of a series of buttons on the remote extends the lease period. In any event, after completion of step 216, the process returns to step 206 for whenever the lease period expires or for whenever an individual decides to purchase the appliance outright.

In much the same manner as the lease steps, the purchase steps 210 include a step 220, wherein the purchaser sends a specified currency amount and the activation number associated with the appliance. At step 222 the manufacturer accepts the currency and sends an activation purchase code to the purchaser. Alternatively, the manufacturer can send a series of remote transmitters and wall stations that implement and allow for full operation of the operator mechanism. Use of such transmitters will permanently erase or bypass the counter/timer criteria used by the controller 52 to prevent any disruption in service associated with the counter or timer. Accordingly, at step 224 entry of the appropriate activation purchase code fully enables the operator mechanism 34.

It will be appreciated that by utilizing the keyless entry transmitter that over one million activation numbers/codes are available. The keyless entry transmitter can either be a 5-button or a 10-button model. For example, the activation number could be a 10-character code, such as 1022A-CD334. In turn, the activation code could be an 8- or a 10-number code. These numbers could then be entered in a predetermined sequence along with certain function buttons on the keyless transmitter as necessitated by the software implemented on the controller and associated devices.

The activation numbers can be generated by a random number algorithm that remains confidential and secure with the manufacturer and wherein the algorithm can be used to associate the activation number with the activation code. Activation numbers are stored in an appropriate computer memory file and associated with each of the activation devices. The activation number is preferably stored in the memory 54 in a ROM or EEPROM at board-level test or at end-of-line opener head test in the operator mechanism manufacturing process. And the activation number is preferably printed onto at least two different labels: one for motor control board marking and one for opener and closure marking. The board-level marking may be readable with the cover of the operator housing removed.

One option for completing the transaction between the manufacturer and the owner of the home or facility is that the purchaser can call the installing dealer, complete their payment and the dealer can provide the purchaser with the necessary activation codes or a transmitter with an embedded electronic key and any additional components needed to allow for full enablement of the operator mechanism. In another option, the purchaser can call the appliance manufacturer or authorized agent, complete their payment and receive the activation codes or transmitter with the electronic key and any additional components can be shipped overnight. Alternatively, the purchaser could email the activation number to a secure web site maintained by the manufacturer which allows completion of their payment, a response with the activation codes by return email, and arrange for the shipment of any additional components by overnight delivery. Yet another alternative is for the purchaser to email the activation numbers to the manufacturer as suggested above but wherein the manufacturer sends the appropriate activation codes for the appliance via a phone line connected to the appliance and schedules for shipment of any additional components. Credit cards may be processed by interfacing with an interactive voice response system that would allow a customer to use their voice or touch-tone phone to enter the activation number, and credit card number and in turn receive their activation code. Accordingly, a simple touch-tone telephone transaction could be used to exchange payment for the activation codes needed to fully enable the operator mechanism.

Figure 7:
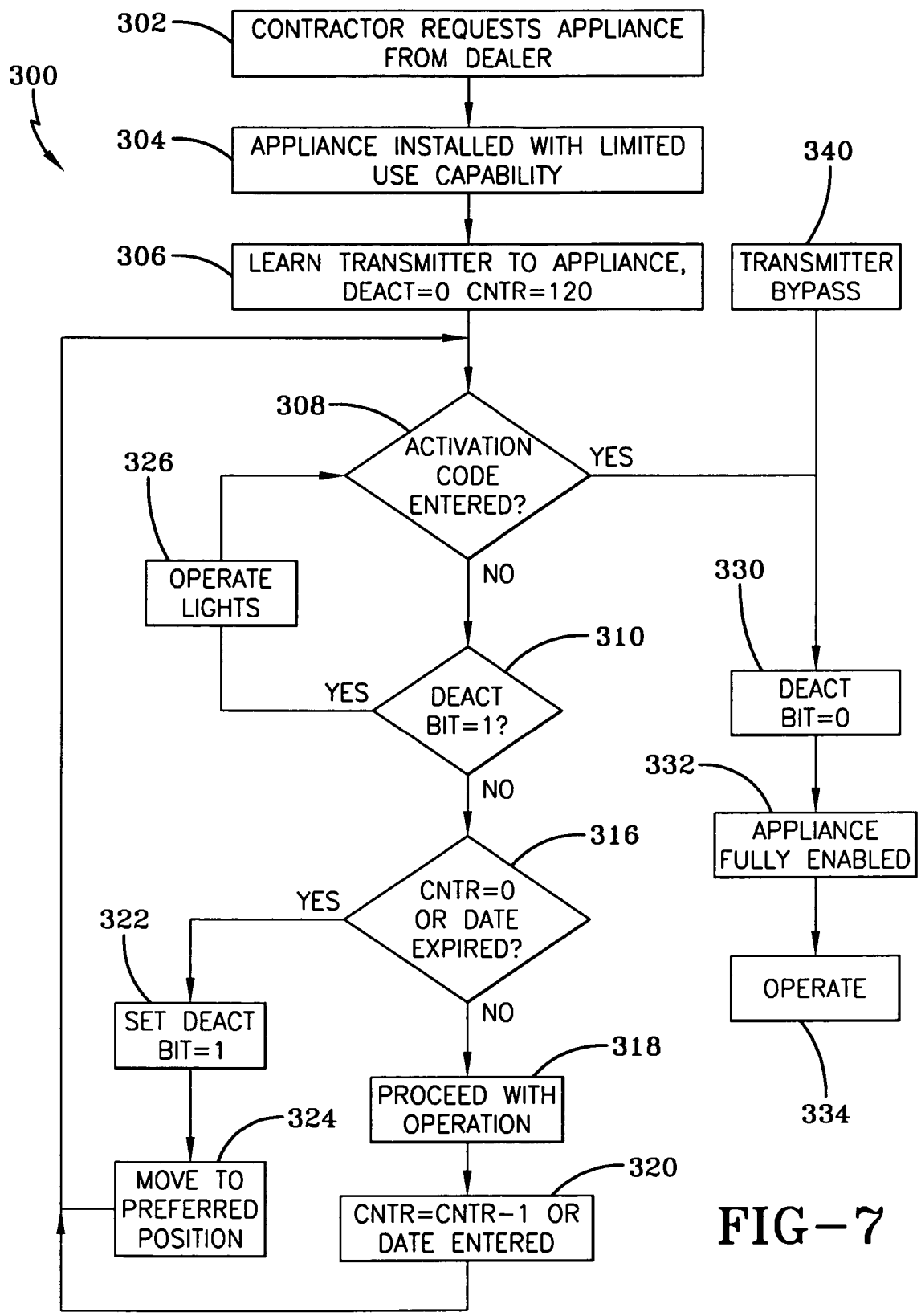
FIG. 7 is an operational flow chart for enabling and disabling the pre-installed operator.

Referring now to FIG. 7, it can be seen that the steps for implementing the operator mechanism's operation are designated generally by the numeral 300. As previously discussed, at step 302 a contractor requests installation of an appliance from an authorized dealer. At step 304 the appliance is installed with the limited-use capability, wherein "limited-use" refers to the number of cycles or a predetermined expiration date. Following this, at step 306, a transmitter device such as the transmitter 44 is learned to the appliance such that it is recognized as the particular transmitter device controlling the appliance. At this time, a deactivation bit, which is maintained by the memory 54 of the operator mechanism, is set to zero and the counter/timer mechanism is set to the predetermined criteria. In the event a counter is used, it is believed that 120 open/close cycles will be used and if a date designation is selected, then approximately three months from the installation date will be stored in the counter/timer 72. Of course, other cycle numbers or expiration dates could be used.

Once a transmitter has been learned to the appliance operator, then, at step 308, the controller 52 looks for entry of an activation code. If an activation code is not received, the process continues to step 310 to determine whether a deactivation bit has been set to a value of 1 or zero. If the bit is not equal to 1, then the process proceeds to step 316 where the counter/timer is checked. If the counter is not equal to zero, or the date has not expired, then the operator proceeds with operation of the appliance. And at step 320 the counter is decremented by one or a new date value is entered for reference. The process then returns to step 308. However, if at step 316 it is determined that the use/timer cycle has expired, then the process proceeds to step 322 where the deactivation bit is reset to a value of one. At step 324 the appliance is moved to a preferred position, which in the case of a garage door is the open position.

The process then returns to the decision step 308 to determine whether at the next subsequent receipt of data or input as to whether the activation code has been entered or not. Presuming that the activation code has not been entered, the process again proceeds to step 310, whereupon if it is determined that the deactivation bit has been set to 1, then the appliance proceeds to step 326 to allow operation of the lights but no other functions of the appliance are permitted to be executed. Accordingly, the process is returned to the decision step 308. By the appliance not working it will be evident to the user of the device that the lease needs to be extended or that the device needs to be purchased. Other light emitting indicia or audio signals could be used to indicate that the lease period has expired. In any event, the user will proceed to the steps outlined in FIG. 6 to obtain an activation lease code or an activation purchase code.

Once an activation code has been obtained and entered at step 308, the process will proceed to step 330 whereupon the deactivation bit is reset to zero and at step 332 the appliance is fully enabled and allowed to operate at step 334 utilizing all of the different transmitters that are useable with the operator.

In the foregoing steps, it will be appreciated that setting the deactivation bit allows for temporary operation of the device until such time that the counter or timer has expired. Accordingly, when the number of cycles has been completely used, the deactivation bit is set to 1 and this precludes or blocks the controller from submitting a normally operable input signal that allows for actuation of the motor and movement of the door and/or operation of the appropriate appliance. Once the device is purchased, then the deactivation bit is permanently cleared and set to zero so as to allow for uninterrupted operation of the operator 34. As such, the controller devices are prevented from blocking the input signals.

At step 340 it will be appreciated that an appropriately programmed transmitter may be supplied by the manufacturer to automatically bypass the deactivation bit and/or counter cycle sequence of steps (308–326) so as to allow for permanent clearing of the deactivation bit and full operation of the operator mechanism as indicated by steps 330-334. This would allow for an installer or dealer to override any lease arrangement if that is deemed appropriate.

As a part of the operation of the pre-installed appliance, it is desirable to provide warnings to the end-user that the ability to use the appliance is coming to a close. This may be implemented by incorporating operational "nuisances" into the controller devices so as to provide some type of warning to the end-user that the activation number or reset number must be purchased so as to allow for continued operation of the appliance. It will be appreciated that at any time during operation of the pre-installed appliance, entry of a correct "activation code" deactivates all cycle count features and the operator functions in a normal mode of operation for the remainder of its operational life. It will also be appreciated that if a once-only "dealer reset code" is received during any mode of operation—normal, nuisance or dead—then the cycle count is reset back to the initial factory set cycle count and the operator remains in a normal mode of operation during the counting operational cycles. In a preferred embodiment it is believed that the dealer reset code may only be reset once; however, multiple reset codes may be employed if desired.

It will be appreciated that there are various types of nuisance modes that may be employed and in a first embodiment once a first cycle count is achieved, the operator enters the nuisance mode of operation which may include "halting" operations of the appliance and resets the cycle counter to a new value. Thereafter, when the operator reaches the cycle count value during a nuisance mode of operation, the operator becomes dead and no further operations are allowed. At this time, the once-only dealer reset code may be used to reset the cycle counter back to its initial factory-set value and returns the operator that is deactivated or in a nuisance mode back to a "normal" operation. In a second nuisance mode embodiment, various levels of nuisances may be provided by the controller. For example, after a predetermined number of uses, a first nuisance mode may comprise a ten second delay of multiple audible "beeps" generated by the speaker 63/89B before any actions of the appliance are allowed. A more onerous nuisance mode may then be employed after a further number of uses which may include a ten second delay that includes beeping and overhead lamp blinking before any door movements are allowed. Finally, a last nuisance mode variation may comprise two minutes of beeping and overhead lamp blinking without any door operation. Of course, other variations of nuisance modes may be employed that provide the end-user with adequate warning, but still allow for safe operation of the barrier or appliance.

Figure 8:
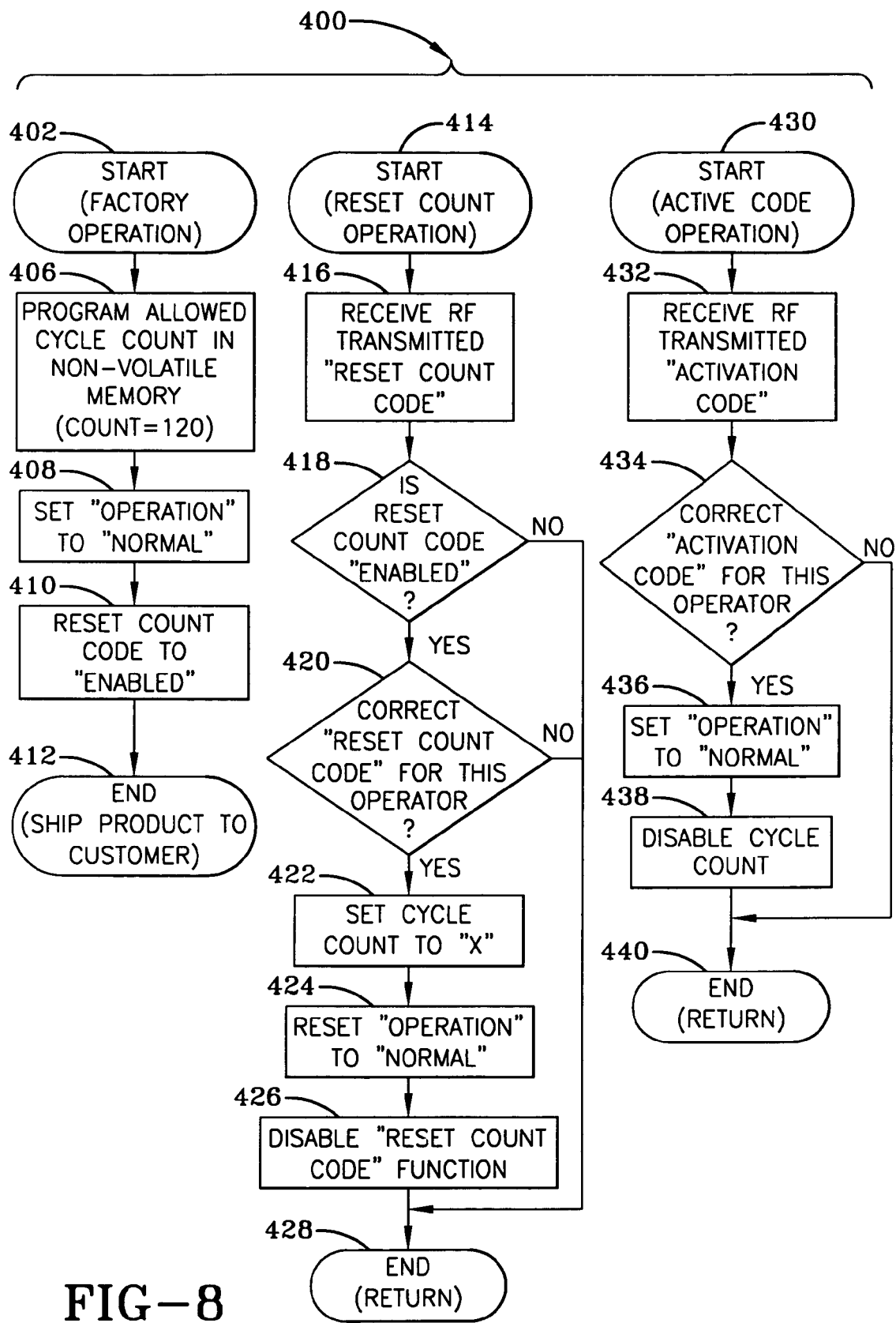
FIG. 8 is an operational flow chart illustrating different modes of operation of an exemplary pre-installed appliance.
Figure 9:
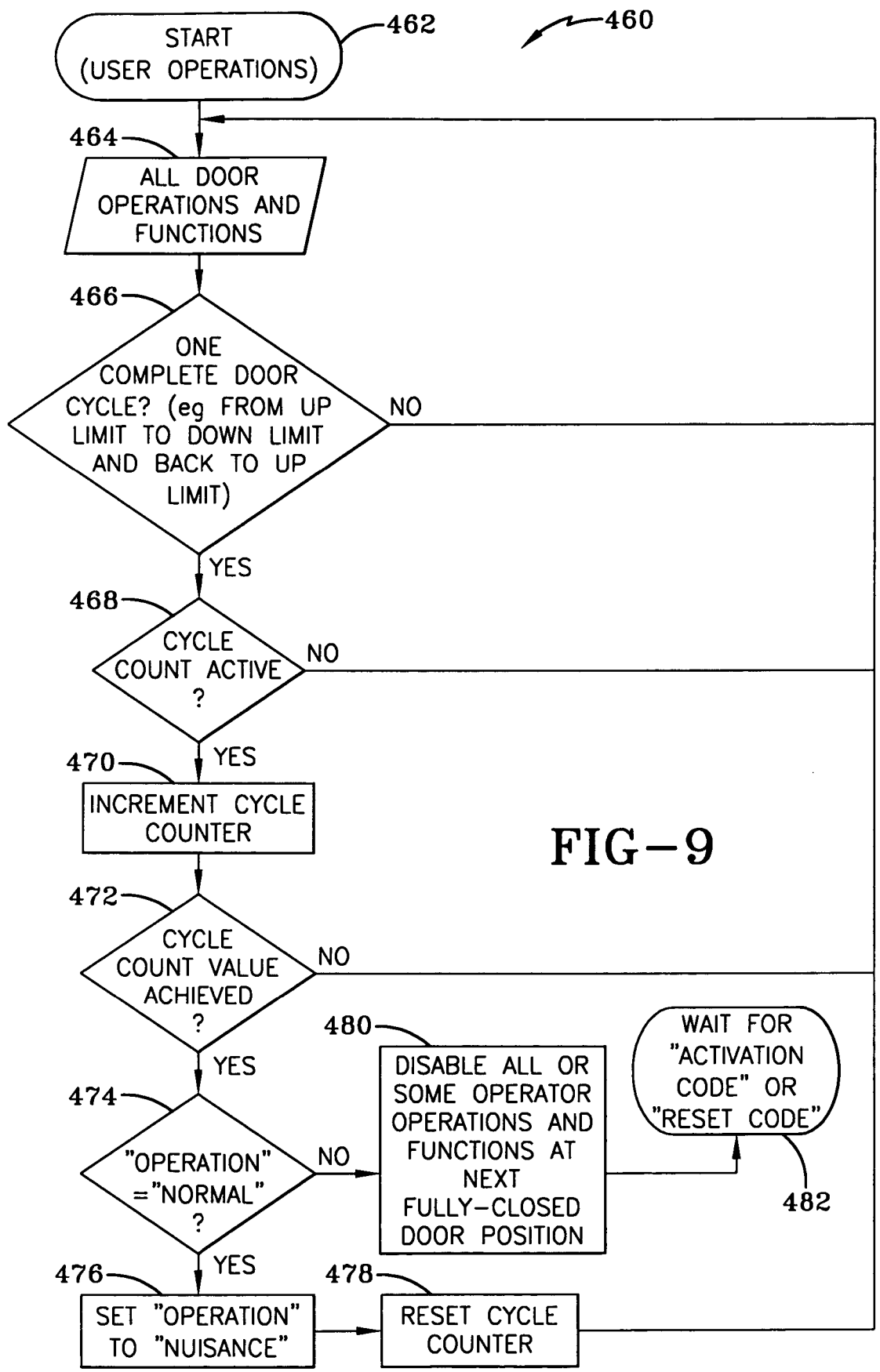
FIG. 9 is an operational flow chart representing the user operations of a first embodiment.
Figure 10:
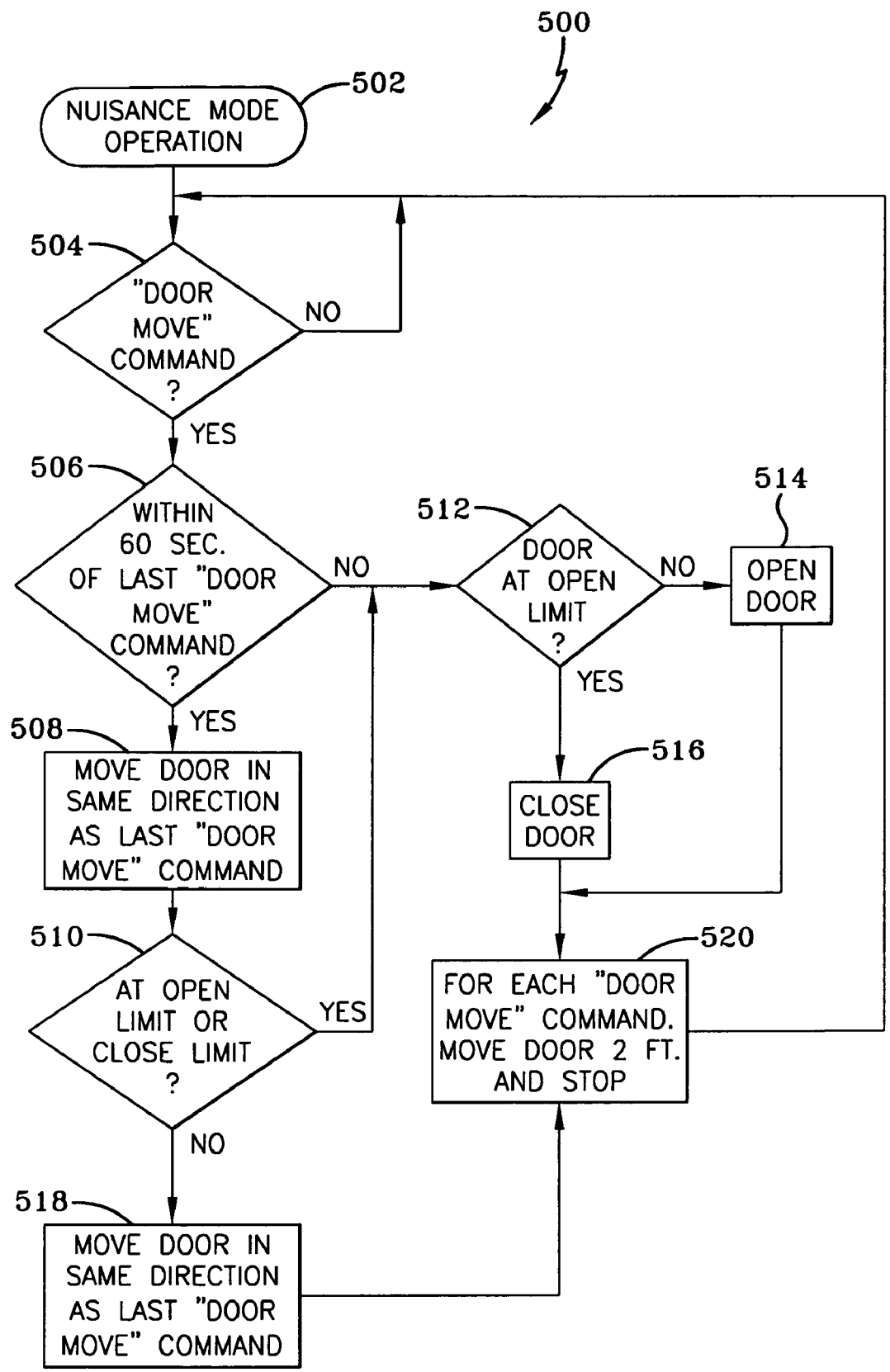
FIG. 10 is an operational flow chart illustrating the first embodiment's nuisance mode operation.
Figure 11:
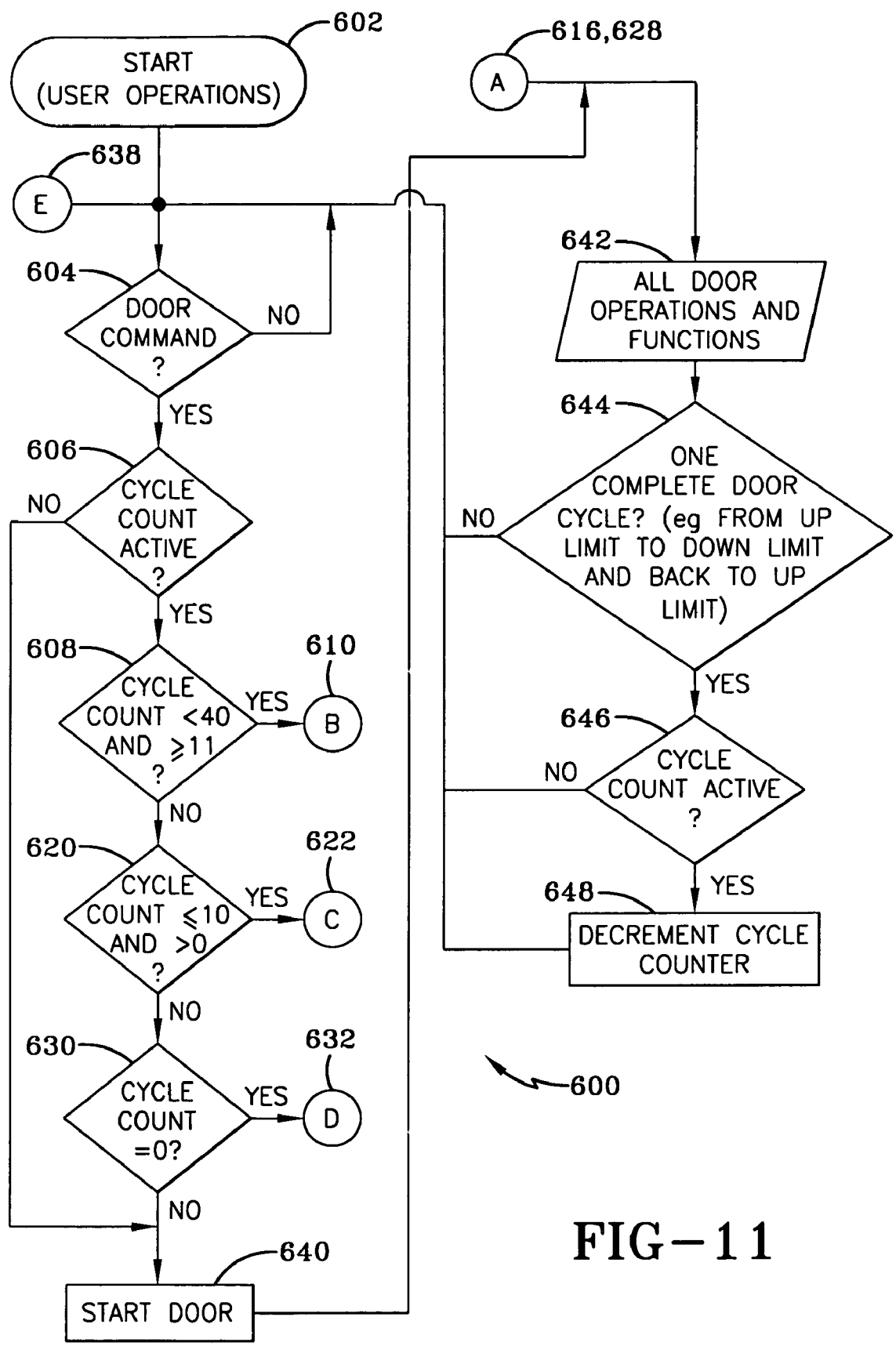
FIG. 11 is an operational flow chart representing the user operations of a second embodiment of the nuisance mode.
Figure 12:
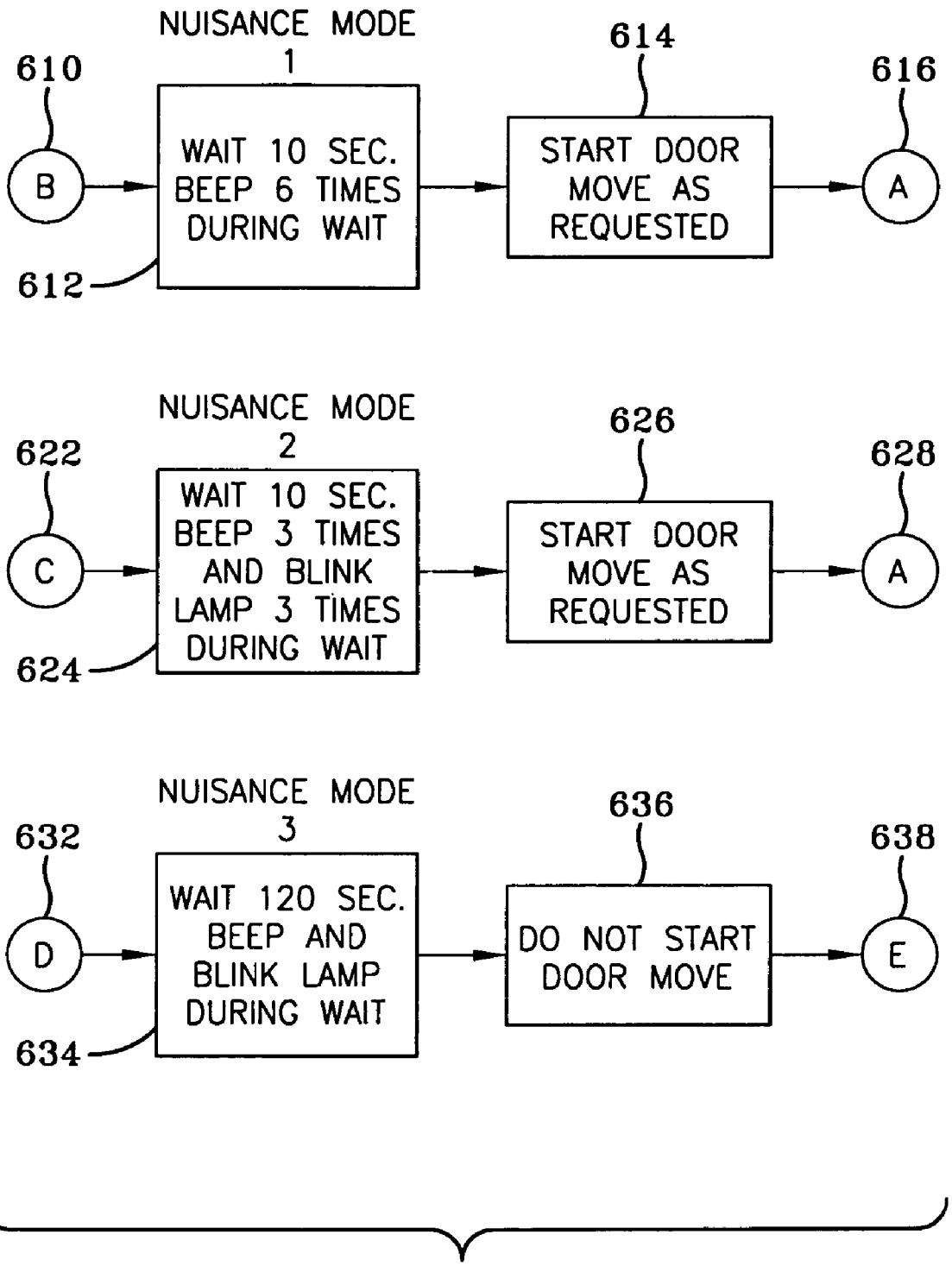
FIG. 12 depicts several operational flow chart subroutines utilized by the second embodiment's nuisance mode.

Specifically referring now to FIG. 8, it will be appreciated that an operational flow chart illustrating the various types of operations of the controller is designated generally by the numeral 400. These controller operations are applicable to both types of nuisance mode operations wherein one nuisance mode of operation is shown in FIGS. 9 and 10 and another nuisance mode of operation is shown in FIGS. 11 and 12. The specific features of the nuisance modes are discussed in detail after a review of controller operations that are applicable to both. Although these various modes are presented in the context of a movable barrier such as a garage door, they are applicable to a home network or any type of appliance.

There are three types of controller operations associated with the pre-installed appliance and they include factory operation, reset count operation, and activation code operation.

The factory code operation starts at step 402 and is preferably performed at in the manufacturer's facility or may also be done by a distributor or installer. In any event, at step 406, the controller is programmed so that a cycle count in a non-volatile memory is set to a predetermined value which in the preferred embodiment is 120 cycles. Next, at step 408, an operation flag is set to "normal" and at step 410 a reset count code flag is set to "enabled." The factory operation is completed at step 412 and the product is shipped to the distributor for installation or it may be shipped directly to the customer.

Once the appliance is installed, the reset count operation may be used any number of times and various counters are adjusted accordingly prior to entry into the nuisance or dead operation modes. These nuisance modes will be discussed in detail following a discussion of the reset count operation and the activation code operations.

The reset count operation, which is designated by step 414, is implemented at any time the controller receives the reset count code in a predetermined manner. Accordingly, at step 416 a radio frequency or direct transmission of the reset count code is received, then step 418 is implemented. At step 418, the controller determines whether the reset count code is enabled or not. It will be appreciated that any number of resets may be employed, although it is believed in the preferred embodiment that only one reset will be allowed. Accordingly, if the reset code count is not enabled then the process is exited. However, if the reset code count is determined to be enabled at step 418, then the process proceeds to step 420 and the controller determines whether the reset count code for this particular operator is correct or not. If the reset count code is correct, then the cycle count is set to a predetermined value such as 120 cycles at step 422. Next, at step 424 the operation flag is reset to normal and then the reset count code function is disabled at step 426. As noted previously, the disablement of the reset count code will be based upon a predetermined number of uses or only one use. Disabling of the reset count code allows for one more set of operational uses of the appliance, but after completion of that set, the activation code must be purchased or the lease otherwise renewed. In any event, upon completion of step 426 or upon negative responses at steps 418 or 420, the reset count operation is exited at step 428.

If the end-user ultimately decides to purchase the pre-installed appliance, then the controller implements the start activation code operation designated at step 430. Accordingly, the activation code is received by the wired or radio frequency signal submitted at step 432 and at step 434 the received activation code is validated for the operator. If the received code is invalid, then the activation code operation is exited, however, if the activation code is correct, then at step 436 the operation is set to normal and the cycle count feature in the controller is disabled at step 438. In other words, the cycle counter is no longer used or monitored since the installed appliance has now been purchased. Upon completion of step 438 or upon confirmation that the activation code received is invalid, then the activation code operation is exited at step 440.

Referring now to FIG. 9, it can be seen that the steps illustrating user operations are designated generally by the numeral 460. These steps are implemented any time after the factory operation steps 402-412 or after implementation of the reset count operation steps 414-428. It will be appreciated that the operations disclosed in FIG. 9 are not implemented once an activation code is received and validated. In any event, at step 462 the user operations are started and at step 464 all door operations and functions are enabled. At step 466, the controller determines whether there has been one complete door cycle. For example, the controller determines whether there has been one complete door cycle from an up limit to a down limit and a return to the up limit. If not, the process returns to step 464. If, however, it is determined that one complete door cycle has been completed at step 466, then the process makes an inquiry at step 468 as to whether the cycle count is active or not. If not, then the process returns to step 464. If, however, it is determined at step 468 that a cycle count is active, then at step 470 a cycle counter is incremented by one. It will be appreciated by those skilled in the art that a cycle counter may also be decremented depending upon the selection of variables. In any event, at step 472 the controller determines whether a cycle count value has been achieved or not. If a cycle count has not been achieved, then the process returns to step 464. But, if at step 472 the cycle count value is achieved, then at step 474 the controller determines whether the "operation" flag in the controller is set to normal or not.

If the operation flag is determined to be normal at step 474, then the process continues to step 476 and the operation flag is reset from normal to "nuisance." Next, at step 478, the cycle counter is reset to a predetermined number and the nuisance mode of operation is in effect. The nuisance mode and its particulars will be discussed in further detail with respect to FIG. 10.

Returning to step 474, if it is determined that the operation flag is not set to normal and since the cycle count value has been achieved, then at step 480 all or some of the operator operations and functions are disabled at the next fully-closed door position or for other appliances a completed cycle or passing of a predetermined event. In other words, it has been determined that the allotted number of cycles in the nuisance mode have been completed and accordingly the controller disables the operator and/or the appliance. Next, at step 482 the controller awaits for entry or receipt of either an activation code or the reset code, if permitted.

Referring now to FIG. 10, implementation of the nuisance mode is designated generally by the numeral 500. At step 502, the nuisance mode operation is entered and as such any door commands and/or function commands received during the nuisance mode operations are executed. Accordingly, at step 504 if a door move command is received, the process continues to step 506. If a door move command is not received at step 504 then the process returns to the initial query and awaits a door move command. At step 506, an inquiry is made as to when the last door move command was received. If the last door move command was received within sixty seconds or other predetermined period of time, then the process proceeds to step 508 and the operator prepares to move the door in the same direction as the last door move command. Next, at step 510, the controller inquires as to whether the door has reached an open or close limit. If one of the limits has been reached, then at step 512 the controller inquires as to whether the door is at an open limit or not. If the door is not at an open limit, then the operator prepares to move the door in the open direction at step 514. However, if the door is at the open limit at step 512, then at step 516 the operator prepares to move the door in the closing direction.

Returning to step 510, if it is determined that the door is not at an open limit or a closed limit, then the operator continues to prepare to move the door in the same direction as the last door move command. Accordingly, upon completion of steps 514, 516 or 518 the process continues to step 520 wherein for each door move command, the operator moves the door two feet, or any other predetermined distance, and stopped. The process then returns to step 504.

In this nuisance mode, whenever the door move command is received, the door only moves the predetermined distance and as such, the user is required to proceed with another actuation of the door move command in order to open or close the door as needed. Accordingly, the nuisance mode of operation is included in the door operations and functions of step 464 and is continued until such time that one of the position limits is reached and the cycle count value is achieved. Since the nuisance mode is no longer considered to be normal at step 474, then step 480 is implemented as shown in FIG. 9. This nuisance mode of operation provides the benefit of allowing the user to still move the door, but it operates in such a halting manner that the end-user is compelled to either purchase the activation code of the installed appliance or in the alternative not use the operator appliance, or undertake the expense of having the operator appliance replaced.

Referring now to FIGS. 8, 11 and 12, it will be appreciated that another type of nuisance mode is designated generally by the numeral 600. In this mode, the user starts operations at step 602 and following this at step 604, the controller inquires as to whether a door move command has been received or not. If a command has not been received, then the inquiry is repeated on a periodic basis. Once a door command is received at step 604, then the controller, at step 606, inquires as to whether the cycle count is active or not. If the cycle count is active, then at step 608 it is determined whether the cycle count is less than 40, and greater than or equal to 11. If this is the case, then it is presumed that at least 80 and up to 109 operations of the designated 120 cycle operations have been executed and the process performs a subroutine B designated generally by the numeral 610. The subroutine B, also referred to as nuisance mode 1 and shown in FIG. 12, implements step 612 which comprises waiting for ten seconds, during which the controller causes the speaker to beep six times and then at step 614 the door move is implemented. The process then returns to the user operation process at step 616 in FIG. 11 designated by the encircled A.

Returning to step 608, if the cycle count is not between cycle counts 40 and 11, the process proceeds to step 620. At step 620 the controller inquires as to whether the cycle count is less than or equal to 10, and greater than 0. If this is the case, then the controller proceeds to implement subroutine C designated generally by the numeral 622. Subroutine 622, also referred to as nuisance mode 2 and shown in FIG. 12, provides for a ten second wait during which the speaker beeps three times and the lamp is blinked three times. Upon completion of this nuisance mode, the controller executes step 626 and the door is moved as requested. Upon completion of this step, the controller returns to step 628 in FIG. 11 designated by the encircled A.

Returning to step 620 if the controller determines that the cycle count is not between cycle counts 10 and 1, then the controller proceeds to step 630 where it is determined whether the cycle count is equal to 0 or not. If the cycle count is equal to 0, then the subroutine D designated generally by the numeral 632 and shown in FIG. 12 is executed. Subroutine D, also referred to as nuisance mode 3, includes a process step 634 which is implemented and causes the controller to wait for 120 seconds and during that time the speaker beeps and the lamp blinks during that wait. Upon completion of the blinking and beeping the controller executes step 636 which does not allow for any door movement at all. Upon completion of this step, subroutine E, designated generally by the numeral 638, is implemented. Step 638 returns the controller to the flow chart at step 604 for receipt of a door command. Accordingly, steps 634 and 636 are implemented only upon the expiration of all uses of the device.

Returning now to step 630, if the cycle count is not equal to 0 it will be appreciated that the cycle count is then somewhere between 120 and 41 count uses and the door is moved at step 640. Upon completion of the door moving step, the process proceeds to step 642 whereupon any completion of steps 616, 628 or 640 cause the controller to proceed with step 642 to enable all door operations and functions. Next, the controller inquires as to whether one complete door cycle has been completed or not. If a complete door cycle has not been preformed, then the process returns to step 604. If, however, a complete door cycle has been completed at step 644, the process continues to step 646 to determine whether the cycle count is active or not. If the cycle count is not active then the process is returned to step 604 and the door commands are received movement of the door is allowed. Steps 646 and 606 indicate that the activation code or the reset code has been received, and, as such, the nuisance modes are no longer viable. In any event, if the cycle count remains active at step 646, then at step 648 the cycle counter is decremented and then the process is returned to step 604. Although 120 total cycles are allowed and various types of nuisances are implemented at cycle counts 39, 10 and 0, other total cycle values and nuisance count levels could be used.

Based upon the foregoing, the advantages of the present invention are readily apparent. In particular, it will be appreciated that a controller-based appliance can be shipped fully operational and will become non-functional after a predetermined number of operations or after a set period of time. Accordingly, the appliances can only become fully operational again after a specific reactivation process, which includes submission of an activation number and an appropriate payment in return for an enabling activation code. Accordingly, payment for the operator or appliance can be collected when a reactivation process is requested. This allows for the operator to be shipped from a factory without remote transmitters such that only a single transmitting device may be employed during the leasing period. Upon ending of the leasing period and purchase of the operator, the remote transmitters can be shipped when the reactivation process is completed. These steps allow for the operator to be installed in the home or facility prior to the structure being finished. In the event the cycle time or lease period expires, the system allows for the operator to be partially functional inasmuch as the light associated with the appliance can be operated but nothing else.

These process and system advantages allow for the installing dealer or the factory to sell the appliance directly to the consumer, rather than utilizing the middle-man contractor. This benefits contractors in reducing their out-of-pocket expenses and the liability associated with the operating deice. Moreover, the hard wiring for the appliance can be specifically related to the particular installation and it allows for the appliance to be professionally installed at no additional cost to the builder or contractor. Yet another advantage of the present invention is that the cost of the appliance is not included in the construction of the home or facility, and as such, the value of the home is increased by having the appliances already installed.

Still further advantages of the present invention are that it allows for the installing dealer or factory representative to have direct communication with the customer, allowing ongoing service and support. The appliances can be ordered and billed directly to the consumer, rather than through the contractor or builder, and can be sold and installed prior to the structure being sold to reduce the selling price of the structure and reduce complications for any new home or facility buyer. Moreover, auxiliary components for the appliances, such as remote controls and cord sets, can be shipped at a later time and do not become lost or damaged by the construction crews. A primary benefit of this system and disclosed method is that it changes the point of sale from the builder/constructor to the dealer/factory. And since the appliance is installed prior to completion of the construction of the house or facility, it can be hard-wired for specific operations, eliminating the need for vestigial outlets. Accordingly, builders can become more competitive and provide a service which other builders do not offer.

Yet other advantages of the present invention are provided by the manner in which the prospective purchaser is warned about expiration of the initial-use period. The end-user may be warned via direct halting movements of the barrier or by other perceptible warnings such as audible sounds and flashing lights in any number of combinations. These warnings are removed when the controller receives a valid activation code for purchase or lease, or upon receipt of a valid reset code. These warnings provide the end-user with adequate notice and time to purchase the appliance or take steps to replace the appliance.

Thus, it should be evident that the pre-installed appliance and method for purchasing the same disclosed herein carries out one or more of the objects of the present invention set forth above and otherwise constitutes an advantageous contribution to the art. As will be apparent to persons skilled in the art, modifications can be made to the preferred embodiments disclosed herein without departing from the spirit of the invention, the scope of the invention herein being limited solely by the scope of the attached claims.

What is claimed is:

1. A limited-use appliance which generates expiration warnings, such that full enablement of the appliance is only implemented upon procurement of either a purchase or lease of an activation code, comprising:
   at least one input device for generating at least one of an activation signal and an input signal;
   a controller associated with said at least one input device and receiving said activation and input signals, said controller initiating at least one limited-use function of the appliance upon receipt of said input signal;
   a memory device associated with said controller, said memory device storing an activation code;
   a test device maintained by said controller, said test device having a predetermined criteria which determines whether said input signal should be sent on to said controller, said input device adapted to input said activation code via said activation signal, wherein if said inputted activation code matches said activation code stored in said memory device, said controller permanently disables said test device from blocking the receipt of all subsequent said input signals, thus fully enabling the appliance; and
   a warning system maintained by said controller and monitoring said predetermined criteria, said warning system generating a warning signal when said predetermined criteria reaches a predetermined level indicating upcoming expiration of an initial-use period.

2. The limited-use appliance according to claim 1, wherein said test device is a counter set to a first predetermined value which is adjusted each time said input signal is sent to said controller, and wherein said test device blocks said input signal when said counter reaches a second predetermined value.

3. The limited-use appliance according to claim 2, wherein said predetermined criteria has more than one said predetermined level and said warning system generates said warning signal in a manner corresponding to said predetermined level.

4. The limited-use appliance according to claim 3, further comprising:
   at least one perceptible output device connected to said warning system, said perceptible output device generating said warning signals depending upon said predetermined levels.

5. The limited-use appliance according to claim 4, wherein said perceptible output devices are selected from a group consisting of an illumination device and an auditory device.

6. The limited-use appliance according to claim 5, wherein a first predetermined level causes one of said perceptible output devices to generate said warning signal for a first predetermined period of time.

7. The limited-use appliance according to claim 6, wherein a second predetermined level causes both of said perceptible output devices to generate said warning signal for a second predetermined period of time.

8. The limited-use appliance according to claim 7, wherein a third predetermined level causes both of said perceptible output devices to generate said warning signal for a third predetermined period of time.

9. The limited-use appliance according to claim 1, wherein said controller is associated with a bridge device that enables a home network system.

10. The limited-use appliance according to claim 1, wherein said controller is associated with a barrier operation which moves a barrier between limit positions.

11. The limited-use appliance according to claim 10, wherein said test device is a counter set to a first predetermined value which is adjusted each time said input signal is sent to said controller, and wherein said test device blocks said input signal when said counter reaches a predetermined value.

12. The limited-use appliance according to claim 11, wherein:
   said memory device stores a reset code; and
   said input device is capable of generating a reset signal, wherein if said reset signal matches said reset code, said controller modifies the normal movement of the barrier between limit positions.

13. The limited-use appliance according to claim 12, wherein said controller only allows limited movement of the barrier between the limit positions if said reset signal matches said reset code.

14. A method for providing a use expiration warning for a pre-installed appliance, comprising
   installing an appliance with a controller, said controller operating said appliance;
   storing an activation code in a memory device maintained by said controller;
   associating at least one input device from a group of input devices with said controller, wherein said input device generates an input signal to operate said appliance;
   testing a predetermined criteria maintained by said controller;
   generating a warning signal when said predetermined criteria reaches a predetermined level indicating upcoming expiration of an initial-use period;
   blocking said input signal when said predetermined criteria is met:
   generating an activation signal from one of said input devices selected from a group of input devices, said activation signal having a transmitted code;
   comparing said transmitted code to said stored activation code; and
   permanently preventing said controller from performing said blocking step if said transmitted code matches said activation code, such that said appliance permanently operates in a fully functional manner.

15. The method according to claim 14, further comprising:
   associating said controller with one of a home network bridge used as a conduit between said group of input devices and a home network, and a barrier operator which moves a barrier between limit positions.

16. The method according to claim 15 further comprising:
   setting a counter value for said predetermined criteria; and
   adjusting said counter value upon completion of each operational cycle of said appliance.

17. The method according to claim 16, further comprising:

associating at least one perceptible output device with said controller; and generating a first warning from one of said perceptible output devices for a first predetermined period of time when said counter value reaches a first predetermined value.

18. The method according to claim 17, further comprising:

generating a second warning signal from more than one of said perceptible output devices for a second predetermined period of time when said counter value reaches a second predetermined value.

19. The method according to claim 18, further comprising:

generating a third warning signal from more than one of said perceptible output devices for a third predetermined period of time; and blocking said input signal when said third warning signal is generated.

20. The method according to claim 16, further comprising:

moving said barrier only a partial amount between the limit positions when said counter value reaches a predetermined value.

21. The method according to claim 15, further comprising:

storing a reset code in a memory device maintained by said controller;

generating a reset code from one of said input devices; and re-setting said predetermined criteria when said reset code is received by said controller.

22. The method according to claim 21, further comprising:

moving said barrier only a partial amount between the limit positions when said reset code is received by said controller.

* * * * *